Patented Nov. 6, 1945

2,388,236

UNITED STATES PATENT OFFICE 2,388,236

THIOCARBAMYL PIPERIDYL SULPHIDES

Robert H. Cooper, Nitro, W. Va., assignor to Monsanto Chemical Company, St. Louis, Mo., a corporation of Delaware No Drawing. Original application November 6, 1940, Serial No. 364,599. Divided and this application May 26, 1943, Serial No. 488,561

1 Claim. (Cl. 260—293)

The present invention relates to a new and improved class of rubber vulcanization accelerators, to a process of vulcanizing rubber or a rubber containing material and to the vulcanized rubber products obtained with the aid of said new and improved accelerators.

The accelerators of the present invention are the products obtainable by the oxidative condensation of dithiocarbamic acids and primary or secondary amines. More particularly the preferred class of accelerators comprise compounds believed to possess the structure

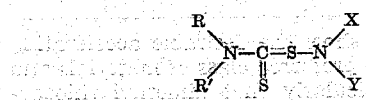

where R and R' represent univalent organic groups and may together form a single divalent organic group. For example R and R' may be the same or different alkyl, aryl, aralkyl or alicyclic groups or are united to form a closed structure. X represents hydrogen or a univalent organic group and further may be combined with Y to form a single organic divalent group, Y otherwise representing a univalent organic group.

In the preferred aspects of the invention X is a member of a group consisting of hydrogen, alkyl and aralkyl radicals and Y is selected from a group consisting of alkyl, aralkyl and alicyclic radicals or X and Y together form a single divalent organic radical.

Still more particularly it has been found that the products derived from primary amines with one notable exception hereinafter pointed out, that is to say compounds in which X is hydrogen, possess accelerating properties superior in many ways to the products derived from secondary amines.

In addition the preferred class of compounds are more active at lower temperatures but at the same time have less tendency to prevulcanize than the corresponding amine salts of the corresponding dithiocarbamic acids.

The new and preferred class of materials may be obtained by a careful oxidation of an aqueous admixture of a dithiocarbamic acid, usually in the form of a water soluble salt, and a primary or secondary amine. However, other methods of preparation may be employed where convenient or desirable. For example some secondary amines form stable N-halogen derivatives which may be reacted with dithiocarbamic acid salts to form the preferred class of materials.

It is desired to point out that this invention is not limited to a few dithiocarbamic acids but that useful compounds may be obtained from any dithiocarbamic acid derived from a secondary amine. Typical secondary amines include morpholine, piperidine, dimethyl amine, hexamethylene imine, dibenzyl amine, methyl cyclohexylamine, dibutyl amine, diamyl amine, dipropyl amine, diethyl amine, diphenyl amine and equivalents and analogues thereof.

While it is not meant to imply that no other amines give oxidative condensation products it has been found that primary and secondary amines stronger than ammonia give excellent results when reacted with dithiocarbamic acids in the presence of an oxidizing agent. However it is again desired to emphasize that other methods of preparation may be utilized where desired since the present invention is not limited to the method by which the new class of accelerators are obtained. Suitable amines comprise piperidine, morpholine, dimethyl amine, diethyl amine, dipropyl amine, di n-butyl amine, di isobutyl amine, di isoamyl amine, diphenyl guanidine, dibenzyl amine, cyclohexylamine, benzyl amine, ethylene diamine, n-butyl amine, n-amyl amine, ethyl amine, p-ethyl cyclohexylamine, allyl amine, hexahydrobenzyl amine and iso butyl amine.

The following specific examples will illustrate the preparation of the new accelerators and are to be understood as illustrative of the invention but not limitative thereof.

*Example I*

Into a suitable vessel there was charged 183.2 parts by weight of an aqueous solution containing substantially 0.3 molecular proportion of sodium dimethyl dithiocarbamate, and 33 parts by weight (substantially 0.33 molecular proportion) of cyclohexylamine. To this mixture maintained at 45–50° C. there was added over a period of about 90 minutes substantially 330 parts by weight of a 10.16% aqueous sodium hypochlorite solution. During the addition of the latter sufficient 40% sulphuric acid was added to keep the potential below 700 millivolts as determined by an antimony electrode in conjunction with a standard saturated calomel half cell, measurement being made with a suitable potentiometer. This corresponds to a pH less than about 12.3. After completion of the reaction the product was extracted from the aqueous vehicle by a suitable organic solvent as for example ether, the solvent extracts washed and the solvent removed by any convenient method. There was finally obtained a pasty solid believed to be dimethyl thiocarbamyl cyclohexylamino sulphide of the formula

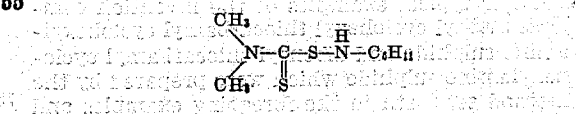

Analysis for sulphur and nitrogen gave the following results:

|  | Calculated for $C_9H_{18}S_2N_2$ | Found |
|---|---|---|
| Nitrogen | 12.8 | 12.6 |
| Sulphur | 29.3 | 27.0 |

*Example II*

Into a suitable reaction vessel there was charged 266.5 parts by weight of an aqueous solution containing substantially 0.25 molecular proportion of sodium cyclopentamethylene dithiocarbamate and 27.5 parts by weight (substantially 0.27 molecular proportion) of cyclohexylamine. To this mixture maintained at 46–51° C. there was added over a period of about two hours substantially 280 parts by weight of 10% aqueous sodium hypochlorite solution. During the addition of the latter sufficient 40% sulphuric acid was added to keep the potential at about 660–765 millivolts, measurement being carried out as in the foregoing example. After the addition of the hypochlorite stirring was continued for about thirty minutes at 50° C. after which the putty like mass which had separated was removed and washed until neutral. The product may be further purified by dissolving in ether, filtering off insoluble impurities and removing the solvent. A good yield of a waxy solid believed to be cyclopentamethylene thiocarbamyl cyclohexylamino sulphide was obtained. The percent sulphur found by analysis was found by analysis was 24.1% as compared to 24.8% calculated for $C_{12}H_{22}S_2N_2$.

*Example III*

Into a suitable reaction vessel there was charged 266 parts by weight of an aqueous solution containing substantially 0.25 molecular proportion of sodium cyclopentamethylene dithiocarbamate and 24.6 parts by weight (substantially 0.27 molecular proportion) of 95% piperidine. To this mixture maintained at about 45°–50° C. there was added over a period of about 135 minutes 280 parts by weight of 10% aqueous sodium hypochlorite solution. During the addition of the latter sufficient 40% sulphuric acid was added to keep the potential at about 700–805 millivolts, measurement being made as in the foregoing examples. After the addition of the oxidizing agent stirring was continued for about thirty minutes at 50° C. after which the charge was cooled and the insoluble product filtered off and washed until neutral. When dry the waxy solid was completely soluble in ether and where a product of higher purity is desired may be recrystallized from ether or other suitable solvent. The product appeared to be the expected cyclopentamethylene thiocarbamyl piperidyl sulphide as indicated by sulphur and nitrogen figures given below:

|  | Calculated for $C_{11}H_{20}S_2N_2$ | Found |
|---|---|---|
| Nitrogen | 11.5 | 11.6 |
| Sulphur | 26.2 | 26.0 |

Other typical examples of the invention comprise methyl cyclohexyl thiocarbamyl cyclohexylamino sulphide and dibenzyl thiocarbamyl cyclohexylamino sulphide which were prepared by the method set forth in the foregoing examples and their composition verified by analysis for sulphur and nitrogen.

As specific embodiments of the invention showing the valuable properties of the new and preferred class of accelerators but without limiting the invention, a rubber stock was compounded comprising

|  | Stock A, parts by weight |
|---|---|
| Pale crepe rubber | 100 |
| Zinc oxide | 10 |
| Sulfur | 3 |
| Stearic acid | 0.5 |
| Dimethyl thiocarbamyl cyclohexylamino sulphide | 0.5 |

The stock so compounded was cured by heating in a press at the temperature of 20 pounds of steam pressure per square inch and found to possess the physical properties set forth below.

| Cure time in mins. | Modulus of elasticity in lbs/in² at elongations of— | | Tensile at break in lbs/in² | Ultimate elongation, percent |
|---|---|---|---|---|
|  | 500% | 700% |  |  |
| 15 | 325 | 1,140 | 2,930 | 870 |
| 20 | 520 | 2,090 | 3,650 | 800 |
| 30 | 715 | 3,100 | 4,415 | 765 |
| 45 | 980 | 3,950 | 4,920 | 750 |

The above data show the desirable accelerating properties of the preferred class of materials and show more particularly that dimethyl thiocarbamyl cyclohexylamino sulphide is a powerful accelerator.

As further specific embodiments of the invention but again without limiting the invention, rubber stocks were compounded comprising

|  | Stock | | | |
|---|---|---|---|---|
|  | B | C | D | E |
|  | Parts by weight | Parts by weight | Parts by weight | Parts by weight |
| Pale crepe rubber | 100 | 100 | 100 | 100 |
| Zinc oxide | 5 | 5 | 5 | 5 |
| Sulphur | 3 | 3 | 3 | 3 |
| Cyclo pentamethylene thiocarbamyl cyclohexylamino sulphide | 0.5 | | | |
| Cyclo pentamethylene thiocarbamyl piperidyl sulphide | | 0.5 | | |
| Methyl cyclohexyl thiocarbamyl cyclohexylamino sulphide | | | 0.5 | |
| Dibenzyl thiocarbamyl cyclohexylamino sulphide | | | | 0.5 |

The stocks so compounded were found to give good cures in either in 60 minutes at the temperature of five pounds steam pressure per square inch or in fifteen minutes at the temperature of twenty pounds of steam pressure per square inch, the cured rubber products exhibiting modulus and tensile properties as follows:

| Stock | Cure time in mins. | Modulus of elasticity in lbs/in² at elongations of— | | Tensile at break in lbs/in² | Ultimate elongation, percent |
|---|---|---|---|---|---|
|  |  | 500% | 700% |  |  |
| B | 60/5 | 495 | 2,380 | 3,700 | 785 |
| C | 60/5 | 610 | 3,080 | 4,355 | 760 |
| D | 60/5 | 300 | 1,350 | 3,170 | 845 |
| E | 60/5 | 465 | 2,210 | 3,750 | 790 |
| B | 15/20 | 340 | 1,470 | 3,310 | 835 |
| C | 15/20 | 470 | 2,250 | 4,350 | 815 |
| D | 15/20 | 240 | 955 | 2,670 | 875 |
| E | 15/20 | 320 | 1,360 | 3,100 | 835 |

The above data show the desirable accelerating properties of the preferred class of accelerators. It will be further noted that cyclopentamethylene thiocarbamyl piperidyl sulphide possesses unusually strong accelerating properties.

Further examples of the new class of compounds comprise

F. Diamyl thiocarbamyl cyclohexylamino sulphide.

G. Diamyl thiocarbamyl benzyl amino sulphide.

H. Dimethyl thiocarbamyl di-n-butyl amino sulphide.

J. Methyl cyclohexyl thiocarbamyl di-n-butyl amino sulphide.

0.5 part by weight of the above compounds were incorporated into rubber stocks comprising 100 parts by weight of pale crepe rubber, 5 parts by weight of zinc oxide and 3 parts by weight of sulphur. The rubber compositions so prepared could be cured by heating for thirty minutes at the temperature of twenty pounds steam pressure per square inch and provided vulcanized rubber products of desirable modulus and tensile properties.

The present invention is not limited to the specific examples hereinbefore set forth wherein the preferred accelerators are employed. Other ratios of the compounding ingredients than those mentioned in the examples as well as other well known fillers, pigments and the like may be employed in the production of various types of rubber compounds and are apparent to those skilled in the art to which the present invention pertains. The present invention is limited solely by the claim attached hereto as part of the present specification.

This application is a division of co-pending application Serial No. 364,599 filed November 6, 1940 now U. S. Patent No. 2,333,468.

What is claimed is:

Cyclo pentamethylene thiocarbamyl piperidyl sulphide.

ROBERT H. COOPER.